United States Patent [19]
Russell et al.

[11] Patent Number: 5,978,530
[45] Date of Patent: Nov. 2, 1999

[54] WAVEGUIDE COUPLER WITH DIFFRACTION GRATING WHICH SELECTIVELY INHIBITS COUPLING

[75] Inventors: Philip St. John Russell, Hampshire, United Kingdom; Jean-Luc Archambault, Victoria, Canada

[73] Assignee: Pirelli Cavi E Sistemi S.p.A., Milan, Italy

[21] Appl. No.: 08/656,230

[22] PCT Filed: Nov. 29, 1994

[86] PCT No.: PCT/GB94/02601

§ 371 Date: Oct. 16, 1996

§ 102(e) Date: Oct. 16, 1996

[87] PCT Pub. No.: WO95/14946

PCT Pub. Date: Jun. 1, 1995

[30] Foreign Application Priority Data

Nov. 29, 1993 [GB] United Kingdom ............... 9324456

[51] Int. Cl.⁶ .................................................. G02B 6/34
[52] U.S. Cl. .......................... 385/37; 385/28; 385/30; 359/130
[58] Field of Search ........................ 385/37, 28, 30, 385/50, 126, 10, 48, 43; 372/6; 359/115, 124, 127, 130

[56] References Cited

U.S. PATENT DOCUMENTS 4,737,007  4/1988  Alferness et al. ................ 385/30
5,187,760  2/1993  Huber ........................... 385/37
5,457,758  10/1995 Snitzer .......................... 385/30
5,550,940  8/1996  Vengsarker et al. ............... 385/28

FOREIGN PATENT DOCUMENTS 0 234 828   9/1987   European Pat. Off. .
0 545 401   6/1993   European Pat. Off. .
61-284 706  12/1986  Japan .

OTHER PUBLICATIONS

Prohaska et al, "Magnification of Mask Fabricated Fiber Bragg Gratings", Electronics Lett., vol. 29, No. 18, pp. 1614–1615, Sep. 1993.

A.S. Svakhin et al., "Narrow–band Bragg reflecting filter based on a single–mode fiber", Jun. 1987, pp. 701–702.

J.P. Weber, "Spectral characteristics Bragg–reflection tunable optical fiber", Oct. 1993, pp. 275–284.

*Primary Examiner*—Hemang Sanghavi
*Attorney, Agent, or Firm*—Renner, Otto, Boisselle & Sklar, P.L.L.

[57] ABSTRACT

A waveguide coupler comprises at least a first waveguide coupled at a coupling region to a second waveguide such that at least a part of radiation propagating along the first waveguide is coupled into the second waveguide. The second waveguide comprises a diffraction grating disposed at the coupling region to inhibit coupling of radiation from the first waveguide into the second waveguide at wavelengths characteristic of the diffraction grating.

2 Claims, 3 Drawing Sheets

WAVEGUIDE COUPLER WITH DIFFRACTION GRATING WHICH SELECTIVELY INHIBITS COUPLING

TECHNICAL FIELD OF THE INVENTION

Background of the Invention

This invention relates to waveguide couplers.

Waveguide couplers are employed to transfer electromagnetic radiation between two or more coupled waveguides. For example, optical fibre waveguide couplers couple two or more optical fibers together so that light launched into one fibre is at least partially coupled into the other fibre(s). These techniques are described in the publication "Optical Waveguide Theory", (Chapman and Hall, London, 1983).

Attempts have been made to combine waveguide couplers with optical fibre gratings to produce wavelength-selective splitting of an optical signal. Such an arrangement would be very useful in splitting, for example, wavelength-division multiplexed optical communication signals, and would replace the present use of bulk (non-fibre) optical devices such as optical circulators. In one form, these grating-couplers use a 50:50 2×2 directional coupler (i.e. one in which half of the light launched into one of two coupled fibers is coupled into the other fibre) with a fibre grating on one of the output ports of the coupler. The fibre grating acts in effect as a wavelength selective mirror, reflecting light at or near to a particular wavelength (referred to as the "Bragg" wavelength), and transmitting light at other wavelengths. The reflected light passes back into the coupler and is split once again between the two fibers.

The result of this arrangement is that light launched into the first fibre at the Bragg wavelength is reflected back to one of the output ports of the second fibre, but is diminished in intensity by 75% (having passed through the 50:50 coupler twice). The transmitted light also suffers a loss of 50%. In, for example, a communications system involving signal transmission along long lengths of optical fibre, these additional losses impose greater constraints on the length of optical fibre which can be used, the signal to noise ratio of the received optical signal, and/or the number of optical channels which can be propagated along a single fibre.

In another form, as described in the publication entitled "Compact all-fibre narrowband transmission filter using Bragg gratings" (European Conference on Optical Communication, ECOC '93 post-deadline paper 12.8, page 29, 1993), the grating-couplers use a 50:50 2×2 directional coupler with fibre gratings on each of the output ports of the coupler. The fibre gratings reflect light at or near to the Bragg wavelength, and transmit light at other wavelengths. The reflected light passes back into the coupler arid is recombined in such a way as to re-emerge from the second input port of the coupler. For this to work, the recombination must be interferometrically exact, making the device potentially highly sensitive to environmental changes.

EP-A-0 234 828 discloses a coupler in which a grating disposed between the two fibers causes wavelength-selective contradirectional coupling.

SUMMARY OF THE INVENTION

This invention provides an optical fibre coupler comprising at least a first optical fibre coupled at a coupling region to a second optical fibre such that at least a part of radiation propagating along the first optical fibre is coupled into the second optical fibre;

characterised in that the second optical fibre comprises a diffraction grating disposed within the core of the second optical fibre at the coupling region to inhibit coupling of radiation from the first optical fibre into the second optical fibre at wavelengths characteristic of the diffraction grating.

The invention addresses the above problems by providing a wavelength selective coupler in which the coupling from one optical fibre to another can be selectively inhibited by the use of a diffraction grating disposed at the coupling region in the recipient optical fibre. This arrangement can therefore be referred to as a "grating frustrated coupler". The wavelengths inhibited from coupling can be similar to those lying within the "stop band" of the grating. By increasing the strength of the grating, the inhibition to coupling can be increased. The wavelength selective properties therefore do not depend on multiple passes through an intensity dividing coupler and so the overall power losses involved in selecting a particular wavelength range can be reduced.

In a preferred embodiment, substantially all of the radiation is coupled into the second optical fibre at wavelengths other than the wavelengths characteristic of the diffraction grating. This then provides an efficient channel-dropping filter, in which the characteristic wavelengths remain in the first optical fibre, and the remainder of the radiation is coupled into the second optical fibre. The power loss suffered by the remainder of the radiation is thus very low.

In order to equalise any disruption to the propagation through the two optical fibers caused by the presence of the diffraction grating in the second optical fibre, in a preferred embodiment the first optical fibre comprises a diffraction grating disposed at the coupling region the characteristic wavelengths of the diffraction grating in the first optical fibre being different to the characteristic wavelengths of the diffraction grating in the second optical fibre. The diffraction grating in the first optical fibre can have characteristic frequencies which are far removed from the wavelengths of interest and thus can serve merely to provide similar propagation in the two optical fibers (which in turn can improve the coupling efficiency). Alternatively in embodiments of the invention the first optical fibre is uniform or substantially uniform (i.e. it does not have a grating).

Improved wavelength selection performance can be obtained in preferred embodiments in which the diffraction grating in the second optical fibre extends along the second optical fibre beyond the coupling region. It is further preferred that the diffraction grating in the second optical fibre is substantially twice as long as the coupling region.

It is preferred that the diffraction grating in the second optical fibre comprises a periodic modulation of the refractive index of the second optical fibre. Because some techniques for the fabrication of such periodic modulations also tend to raise the spatially averaged refractive index of the fibre, it is preferred that this is compensated by the first optical fibre (or at least the coupling region of the first optical fibre) having a higher refractive index than the second optical fibre.

A coupler according to the invention is particularly advantageously employed in communication apparatus.

BRIEF DESCRIPTION OF THE DRAWINGS

The invention will now be described by way of example with reference to the accompanying drawings throughout which like parts are referred to by like references, and in which.

DETAILED DESCRIPTION

Figure 1:
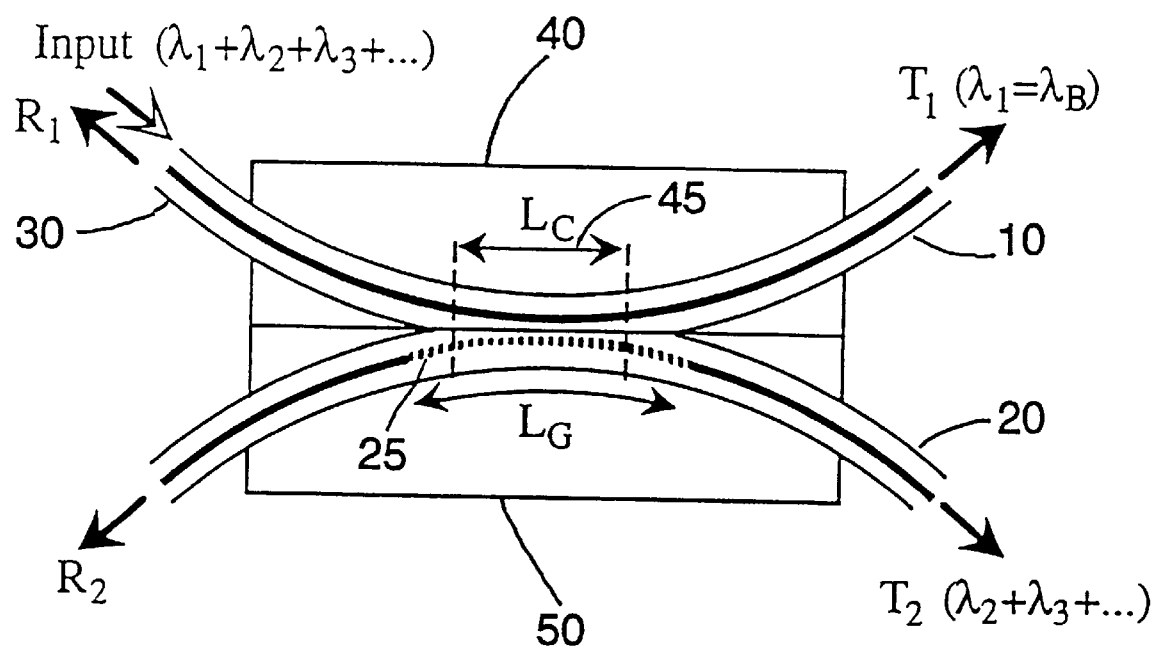
FIG. 1 is a schematic diagram of a grating-frustrated coupler.

Referring now to FIG. 1, a grating-frustrated coupler comprises two single-mode optical fibre waveguides 10, 20 arranged to form a 2×2 directional coupler. The two fibers are mounted in respective glass blocks 40, 50, and the fibers and blocks are then polished to remove most of the fibre cladding along one side. The glass blocks are then clamped together, aligning the two exposed fibers along a coupling region 45 of length $L_C$.

The cores of the two optical fibers are substantially identical in most respects, except that the core of one of the fibers (the fibre 20) contains a photorefractive Bragg grating 25 having a length $L_G$. The grating comprises a periodic modulation of the refractive index of the core of the fibre 20, with a spatial period $\Lambda$ and amplitude $\delta n$. The spatially-averaged refractive index inside the grating, $n_{av}$, is substantially equal to the index of the core of the other optical fibre (the fibre 10).

In operation, light comprising a continuous or discrete spectrum of wavelengths $\lambda_1 + \lambda_2 + \lambda_3 \ldots$ is launched into one end 30 of the fibre 10. Light at a wavelength $\lambda_1 = \lambda_B$, where $\lambda_B$ is the Bragg wavelength of the grating, does not couple into the fibre 20 and thus emerges at the other end of the fibre 10. The remainder of the light launched into the coupler, i.e. $\lambda_2 + \lambda_3 \ldots$, is coupled into the fibre 20.

The optical fibre grating is fabricated by an ultraviolet (UV) inscription process, in which two coherent beams of UV light are directed onto the optical fibre at different angles of incidence. This technique is described in the article "Fibre Gratings", Physics World, October 1993. The exposure produces interference fringes between the two beams, along the direction of the fibre. Since the refractive index of a fibre core is modified by exposure to intense UV radiation, this means that a periodic modification of the refractive index of the core will take place, with greater modification occurring at antinodes (maxima) of the interference pattern than at nodes (minima). The exposure to UV light also tends to increase the average refractive index of the exposed fibre core.

During fabrication of the grating, light from a broad-band light source (e.g. a light emitting diode or LED light source) is introduced into one end of the fibre, and the transmitted spectrum monitored at the other end of the fibre. This allows the fabrication process to be continued until the desired grating properties have been achieved.

The Bragg wavelength of the grating is given by $\lambda_B = 2 n_{eff} \Lambda$, where $n_{eff}$ is the so-called mode index of the fibre core. Away from the Bragg wavelength, light propagates in the grating region of the coupler as if it were in a medium of uniform refractive index $n_{av}$; the coupler of FIG. 1 is then equivalent to a synchronous coupler, able to perform a substantially complete transfer of power between the two fibers.

Near the Bragg wavelength, within the spectral region known as the stop-band, the grating has two effects on the operation of the coupler of FIG. 1: first, it introduces a strong dispersion, making the coupler asynchronous or phase-mismatched; and second, it creates a barrier (a one-dimensional photonic bandgap) that rejects photons attempting to tunnel through from the fibre 10 to the fibre 20.

If the grating fabricated in the fibre 20 is sufficiently strong (i.e. the amplitude $\delta n$ of the index modulation is sufficiently large), then the two effects described above can efficiently frustrate the transfer of optical power in the stop band from the fibre 10 to the fibre 20.

Accordingly, a grating-frustrated directional coupler as illustrated in FIG. 1 can be used as an all-fibre channel-dropping filter, transmitting wavelengths within the grating stop-band through the fibre 10, while other wavelengths pass from the fibre 10 into the fibre 20.

Coupled-wave theory has been used to model the operation of the grating-frustrated coupler of FIG. 1, using a similar approach to that applied to so-called "grating-assisted couplers" in the publication "Theory of Dielectric Optical Waveguides", 2nd ed. (Academic Press, 1991), Chapter 7, pages 280–293. This theoretical analysis will now be described, and then compared with experimental results obtained from tests performed on prototypes of the present embodiment.

In the theoretical analysis, light propagating in each of the two fibers 10, 20 is decomposed into a backward and a forward guided wave. In the coupling region, which has an effective length $L_C$ (FIG. 1), each pair of co-propagating waves exchanges power with a coupling constant C; inside the grating region of length $L_G$ (FIG. 1), the forward and backward waves of the fibre 20 are also coupled together, with a coupling constant $\kappa = \pi \delta n / \lambda$, where $\lambda$ is the vacuum wavelength of the light in question.

If the coefficients C and $\kappa$ are assumed constant over the coupling and grating regions, respectively, then the fraction of the input power at each of the four output ports, i.e. $T_1$, $T_2$, $R_1$ and $R_2$, can be calculated analytically by solving four coupled wave equations.

To obtain a nearly complete exchange of power between the two fibers outside the grating bandwidth, the product $CL_C$ should be equal to a half multiple of $\pi$ at the wavelength of operation. For the grating to be effective at frustrating coupling, the calculations show that the coupling constant C should be small in comparison to the grating coupling constant, $\kappa$; it is therefore preferable to choose the smallest value of C, given by $CL_C = \pi/2$.

Figure 2:
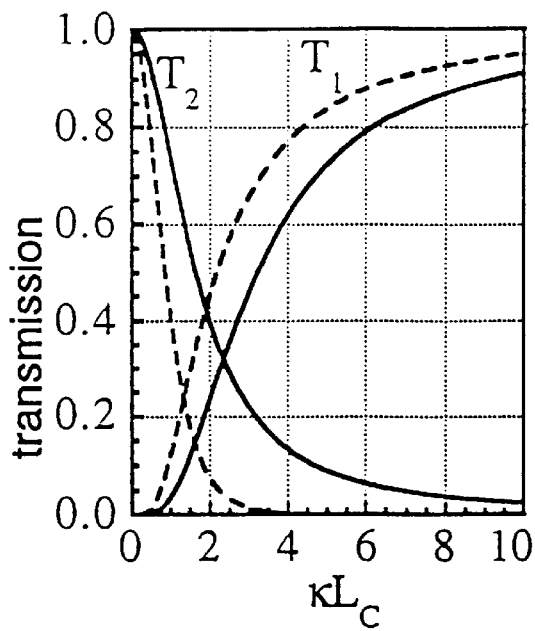
FIG. 2 is a graph illustrating the dependence of the transmission of the coupler of FIG. 1 on grating strength at the Bragg wavelength for two grating lengths.
Figure 3:
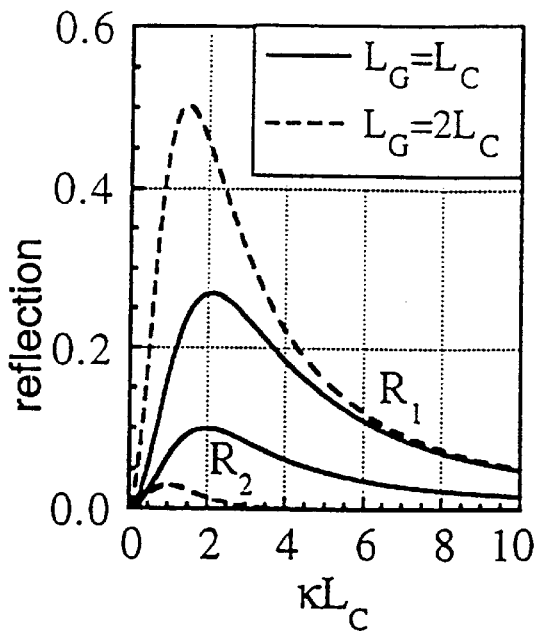
FIG. 3 is a graph illustrating the dependence of the reflectance of the coupler of FIG. 1 on grating strength at the Bragg wavelength for two grating lengths.

FIGS. 2 and 3 are graphs illustrating how the four outputs of a grating-frustrated coupler vary with the grating strength at the Bragg wavelength. In particular, FIG. 2 is a graph illustrating the dependence of the transmission of the coupler of FIG. 1 on grating strength at the Bragg wavelength for two grating lengths, and FIG. 3 is a graph illustrating the dependence of the reflectance of the coupler of FIG. 1 on grating strength at the Bragg wavelength for two grating lengths.

Referring to FIG. 2, for $\kappa=0$, the device operates as a conventional 2×2 coupler and, since $CL_C = \pi/2$, there is a complete transfer of power, with $T_2 = 100\%$. As the grating strength is increased, however, $T_2$ decreases to 0 and $T_1$ tends towards 100%. As illustrated in FIG. 3, a large fraction of the input light can also be reflected. For $L_G = L_C$, the reflected signals peak at $\kappa L_C$ approximately equal to 2 but then decay towards zero for larger values of $\kappa L_C$.

It is clear that the stronger the grating is, the more effective it is at frustrating coupling of light at the Bragg wavelength from the fibre 10 to the fibre 20.

FIGS. 2 and 3 also show the effect of extending the grating beyond the coupling region. The longer the grating, the more difficult it is for light to escape through either end of the fibre 20 and, therefore, an important decrease is observed in $T_2$ and $R_2$ when the grating length is increased from $L_C$ to $2L_C$. Consequently, a larger fraction of power is found at the output ports of the fibre 10, $R_1$ being favored in weaker gratings and $T_1$ in stronger ones.

Figure 4:
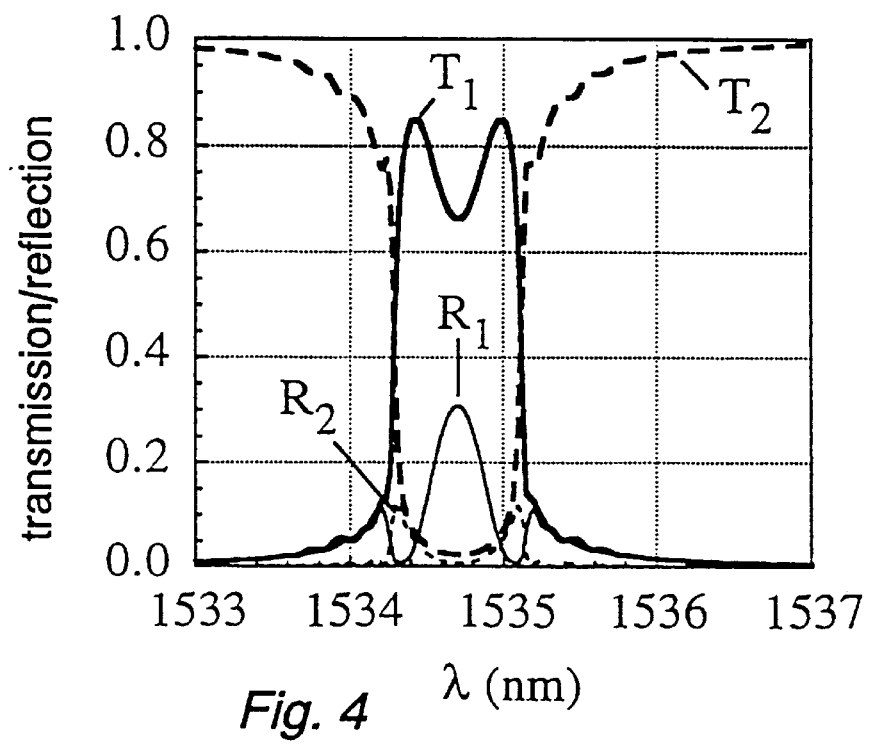
FIG. 4 is a graph illustrating the predicted reflection and transmission spectra of the coupler of FIG. 1.

The calculations indicate that the bandwidth of the grating-frustrated coupler is given to a good approximation by the bandwidth of the grating alone. As an example, FIG. 4 is a graph illustrating the calculated reflection and transmission spectra near the Bragg wavelength of a grating-frustrated coupler with $\kappa L_C$ approximately equal to 3 and $L_G$ approximately equal to $2L_C$. The full width half maximum (FWHM) bandwidth of the transmission spectrum $T_1$, $\Delta\lambda$, is approximately equal to 0.7 nanometer (nm), which is very close to that of a grating with the same index modulation and length. This spectrum has a characteristic central dip, because the phase mismatch caused by the grating actually reaches a maximum at the edges of the grating stop-band, which are located at $\lambda=\lambda_B(1\pm\delta n/2n_{eff})$.

The various grating parameters are chosen for the grating-frustrated coupler to work as required as a filter. In general, an attempt is made to maximise $T_1$ and to minimise $T_2$, $R_1$ and $R_2$ at the Bragg wavelength. Also, for many (though not all) applications, it is desirable for the filter bandwidth to be made as small as possible.

The first of the above requirements can be met by making $\kappa L_C$ as large as conveniently possible. This can be achieved either by having a large index modulation or by using a long coupler region. However, the index modulation is limited not only by the photorefractivity of the fibre 20, but also by the desired filter bandwidth, since $\Delta\lambda$ is approximately equal to $\delta n \lambda_B/n_{eff}$ for a strong grating. Increasing the coupler length also has its limitations: the longer a coupler is, the more difficult it is to obtain a complete exchange of power inside the coupler.

In practice, the average indices of the two fibers forming the coupler will always be mismatched by a small amount, $\Delta n_{av}$; for $CL_C = \pi/2$, the maximum power transfer achievable by the coupler (outside the grating bandwidth) is then limited to $$P = \frac{1}{1 + (2\Delta n_{av} L_C / \lambda)^2} \quad (1)$$

which decreases quadratically with $L_C$, if P is close to 100%.

Taking into account these various considerations in the choice of parameters, a prototype grating-frustrated coupler of the type shown in FIG. 1 has been fabricated by incorporating a photorefractive fibre grating into one half of a polished fibre coupler.

Prior to making the coupler, a grating with $\lambda_B=1535$ nm and $\Delta\lambda=1.1$ nm was written into the fibre 20 by exposing from the side a germania/boron co-doped optical fibre over a 15 millimeter (mm) length for about 10 minutes to two interfering UV beams from a krypton fluoride (KrF) excimer laser. This resulted in an index modulation of approximately $\delta n=6\times10^{-4}$ and also raised the average index of the fibre by about $(8.7\pm0.3)\times10^{-4}$, which was estimated by monitoring the change in Bragg wavelength (as described above) during the UV exposure.

In order to ensure that the average indices of the two fibers would be matched to within a difference of about $\Delta n_{av}=6\times10^{-5}$, a similar grating was also written in the fibre 10, but at $\lambda_B=1550$ nm. The 15 nm spacing between the Bragg wavelengths was large enough to allow the two gratings to be treated independently of each other. (The use of two gratings to match the average fibre indices could be avoided simply by choosing two initially dissimilar fibers and writing a grating only in the fibre with the lower mode index of the two.)

It will be appreciated that the grating in the fibre 10 is not essential, although it can improve the matching of the two fibers in the coupling region. Alternatively, a non-modulated UV exposure of the coupling region of the fibre 10 could be made, to provide a uniform increase in the refractive index of the fibre 10. In other embodiments, the fibre 10 need not be modified at all; in this case, the fibre 10 could be selected to have a broadly similar refractive index to the fibre 20, or possibly the index of the fibre 10 could be slightly greater than that of the fibre 20.

After these exposures, a coupler was fabricated by mounting each fibre into a respective glass block 40, 50 and polishing each fibre and block to within 2 micrometers ($\mu$m) of the core, following the method described in an article by M. J. F. Digonnet and H. J. Shaw, in IEEE J. of Quantum Electron. vol 18, 746 (1982).

The two blocks were assembled in a precision jig for sub-micron control of the fibre alignment. The radius of curvature of the fibers in the blocks was chosen to give an effective coupling length of about $L_C=3$ mm, corresponding to $\kappa L_C$ of about 3.7. According to Equation (1) above, and assuming $\Delta n_{av}$ approximately equals $6\times10^{-5}$, this 3 mm length theoretically allows at least 95% coupling.

Light from a broadband 1540 nm LED was launched into the fibre 10 and the coupler tuned until the output $T_2$ was maximised. In practice, a maximum coupling of 97% was thus obtained, indicating an average index mismatch $\Delta n_{av}$ of about $5\times10^{-5}$. The wavelength response of the coupler was examined by using a white light source and optical spectrum analyser. The coupling was seen to decrease by only about 1% over a 100 nm wavelength range centered at 1535 nm.

A cutback measurement was also performed to compare the total amount of power from all four outputs to the input power launched into the fibre 10; the excess loss of the coupler was found to be about 0.22 decibels (dB). The device was further characterised (i.e. the performance of the device was assessed) by introducing a conventional 50:50 fibre coupler between the LED and the input port in order to have access to the output $R_1$.

Figure 5:
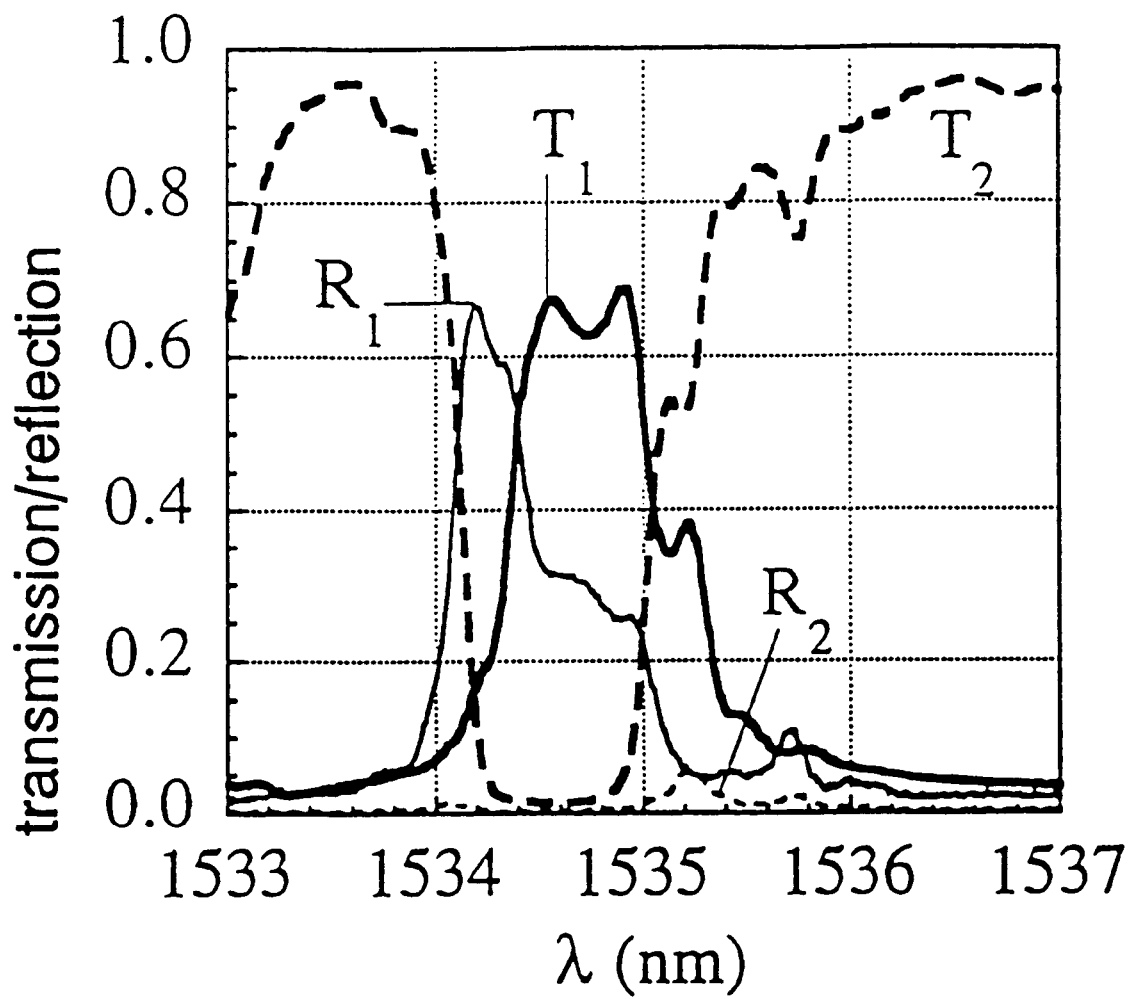
FIG. 5 is a graph illustrating the measured reflection and transmission spectra of the coupler of FIG. 1.

The calibrated reflection and transmission spectra measured at the four ports are shown in FIG. 5. Output $T_1$ has a maximum of about 70% and a bandwidth of about 0.7 nm. The spectrum has the characteristic central dip predicted from the calculations. Away from the Bragg wavelength ($\lambda_B=1534.7$ nm), the transmission $T_1$ drops to about 3%, corresponding to a 13 dB extinction ratio. The other transmission spectrum, $T_2$, has a 1.0 nm bandwidth and 18 dB extinction (1.6% transmission) at the Bragg wavelength. The dip in transmission at 1533 nm is due to resonant coupling into a cladding mode. The reflected signal $R_1$ is larger than expected with a prominent feature at 1534.2 nm, while $R_2$ remains small at all wavelengths, with a 5% maximum at 1535.2 nm.

Comparing the curves shown in FIG. 5 with those shown in FIG. 4, a good theoretical fit of the measured spectra was obtained for $L_C=2.5$ mm, $L_G=5$ mm and $\delta n=6\times10^{-4}$. The discrepancies that can be observed are mainly due to the non-uniformity of the index modulation and average index along the grating region, which may be caused by spatial intensity variations in the UV writing beam. The reflection peak at 1534.2 nm probably originates from an underexposed grating section located outside the coupler region. This would also explain why the main peak in the $T_1$ spectrum is narrower than the dip in the $T_2$ spectrum.

In summary, a grating frustrated coupler of the type described above can be use as an all-fibre, channel-dropping filter. The grating-frustrated coupler operates on the principle that, over a narrow range of wavelengths corresponding to the grating stop-band, coupling is prevented by a strong grating which de-tunes the coupler and creates a one-dimensional photonic band gap. Coupled-wave theory has provided a description of the properties of grating-frustrated couplers, allowing practical limits in the choice of design parameters to be established.

The techniques used in the grating-frustrated coupler above could also be applied to planar optical geometry and to other waveguide technologies such as microwave waveguides. Furthermore, the waveguide couplers can be employed in communication apparatus such as optical communication apparatus. For example, in a wavelength-division multiplexed system, signal-modulated light at a number of discrete wavelengths could be combined into a single optical signal using conventional directional couplers, and then transmitted along an optical fibre to a receiving apparatus. In the receiving apparatus the discrete wavelengths could be separated out for separate optical reception and decoding using one or more waveguide couplers as described above. These could be arranged in series, so that the output end of the fibre 10 in one coupler (i.e. carrying all but the selected wavelength range) is connected to the input end 30 of the fibre 10 in the next coupler. In each coupler, a selected wavelength range is tapped off through the respective fibre 20.

We claim:

1. An optical fibre coupler comprising at least a first optical fibre coupled at a coupling region to a second optical fibre such that at least a part of radiation propagating along the first optical fibre is coupled into the second optical fiber, the second optical fibre including a diffraction grating disposed within the core of the second optical fibre at the coupling region to inhibit coupling of radiation from the first optical fibre into the second optical fibre at wavelengths characteristic of the diffraction grating and wherein the diffraction grating in the second optical fibre extends along the second optical fibre beyond the coupling region.

2. A coupler according to claim 1, in which the diffraction grating in the second optical fibre is substantially twice as long as the coupling region.

* * * * *